March 24, 1959 — G. A. LYON — 2,879,107
WHEEL COVER
Filed April 29, 1955
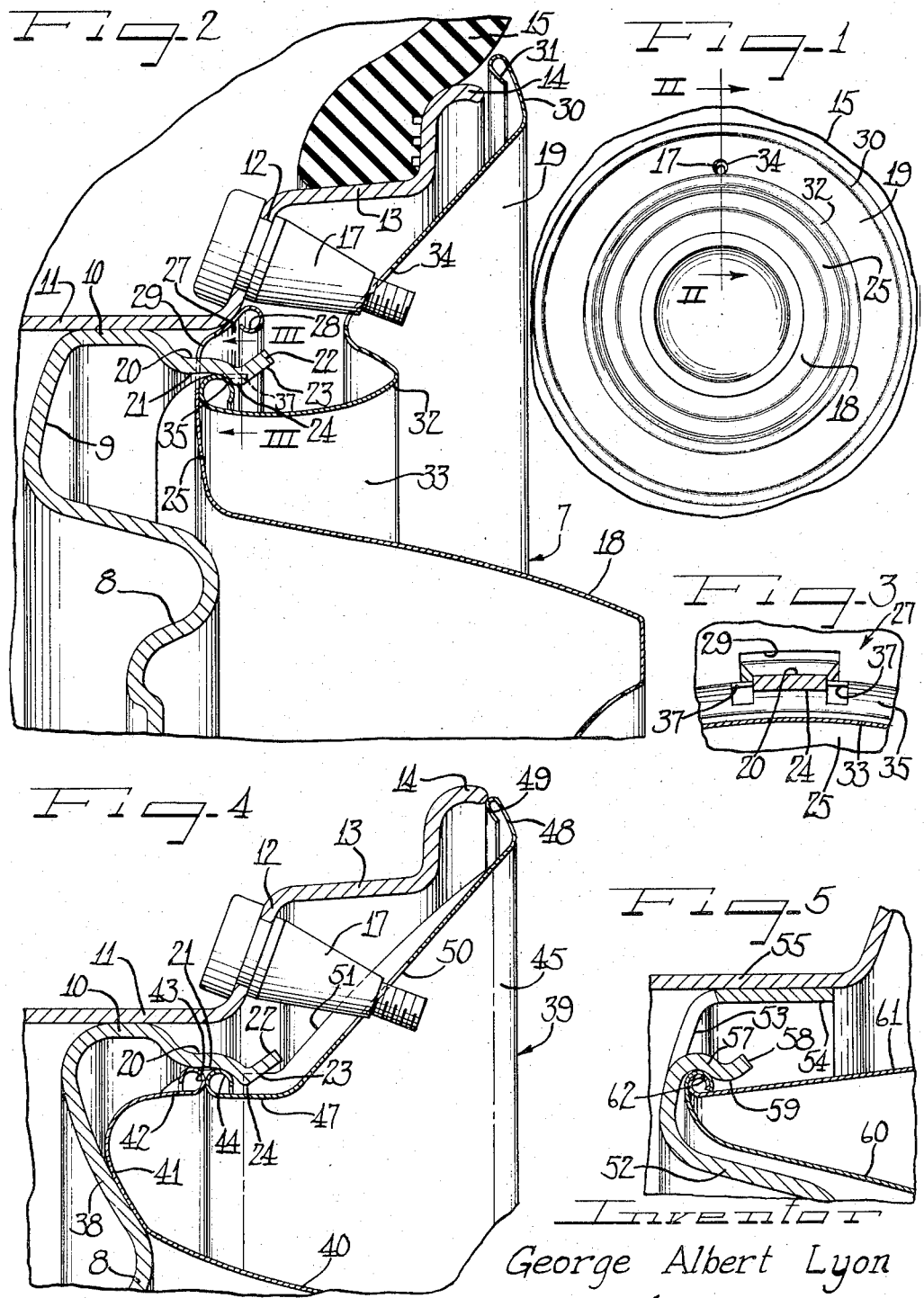
Inventor
George Albert Lyon

United States Patent Office 2,879,107
Patented Mar. 24, 1959

2,879,107

WHEEL COVER

George Albert Lyon, Detroit, Mich.

Application April 29, 1955, Serial No. 504,976

10 Claims. (Cl. 301—37)

The present invention relates to improvements in wheel structures and more particularly concerns the ornamental and protective covering of the outer sides of vehicle wheels.

An important object of the present invention is to provide an improved wheel structure having novel means for retaining a composite wheel cover in place.

Another object of the invention is to provide an improved wheel structure having a novel cover assembly and covered-retaining structure.

A further object of the invention is to provide a novel wheel structure affording a novel cooperative relationship between rigid retaining fingers on the wheel and a cover assembly.

Still another object of the invention is to provide improved cover-retaining means on a wheel structure.

Other objects, features and advantages of the present invention will be readily apparent from the following detailed description of certain preferred embodiments thereof taken in conjunction with the accompanying drawing in which:

Figure 1 is an outer side elevational view of a wheel structure embodying features of the invention;

Figure 2 is an enlarged fragmentary radial sectional view taken substantially on the line II—II of Figure 1;

Figure 3 is a fragmentary sectional detail view taken substantially on the line III—III of Figure 2;

Figure 4 is a fragmentary radial sectional view similar to Figure 2 but showing a modification; and Figure 5 is a fragmentary radial sectional view through a wheel structure showing a further modification.

Having reference first to Figures 1, 2 and 3, a wheel cover assembly 7 is adapted to be applied to the outer side of a vehicle wheel including a disk spider wheel body 8 provided with an annular indented marginal inset groove formation 9 at the radially outer side of which is a generally axially outwardly extending marginal attachment flange 10. This flange 10 is secured in suitable fashion to a base flange 11 of a tire rim from the outer side of which extends a generally radially outwardly extending and axially outwardly facing side flange 12 merging with an intermediate flange 13 extending generally axially outwardly and sloping radially outwardly and leading into a generally radially outwardly and axially outwardly turned terminal flange 14. The flanges of the tire rim are adapted to support a pneumatic tire 15 which may be of the tubeless type or may be a tube and tire assembly. For inflating the tire a valve stem 17 is supported by the side flange 12 and projects generally axially outwardly therefrom.

According to the present invention, the cover 7 is constructed as a separable assembly including an inner circular crown cover member 18 and an outer annular trim cover member 19. These cover members are constructed and arranged for respectively overlying the wheel body 8 and the tire rim, and for cooperation at confronting marginal portions thereof with one another and with cover-retaining means on the wheel body. To this end, the wheel body 8 is provided with cover-retaining extensions 20 projecting generally axially outwardly as one piece metal stamping portions from the outer edge of the body flange 10. Each of the retaining extensions, of which there may be three or four, or as many as desired, circumferentially spaced apart are inset radially inwardly from the tire rim base flange 11 and are provided with generally axially extending radially inwardly facing elongated faces 21 with retaining terminals 22 at the axially outer extremities of the retaining finger extensions. The terminals have generally radially and axially inwardly sloping cam surfaces 23 thereon with radially inwardly projecting overhanging shoulder projections 24 respectively at the outer ends of the faces 21.

The inner circular crown cover member 18 has an annular radially extending marginal flange 25 of substantial diameter for overlying the annular groove or channel portion 9 of the wheel body and of a diameter to extend at its radially outer extremity portion into overlying relation to the base flange 11 of the tire rim and with the marginal extremity providing a generally radially and axially outwardly turned seating portion 27 that engages the shoulder at juncture between the base flange 11 and the side flange 12. A turned finishing and reenforcing bead 28 may be provided on the extremity of the terminal seating portion 27. For accommodating the retaining fingers 20 to project therethrough, the flange 25 has respective clearance aperture 29.

Herein the outer annular cover member 19 is constructed and arranged not only to engage in snap-on, pry-off relation with the retaining finger extensions but also to lock the inner circular cover member 18 in place. To this end, the circular cover member 19 extends from an outer marginal extremity 30 which is adapted to overlie the terminal flange 14 and has a turned reenforcing and finishing bead 31, generally radially and axially inwardly in overlying relation to the tire rim to an annuar inner axially outwardly extending reenforcing rib 32 from which extends a generally axially inwardly directed flange 33. At appropriate location adjacent to the rib 32, the cover member 19 has a clearance aperture 34 through which the valve stem 17 is adapted to project.

For cover-retaining engagement with the retaining fingers 20, the inner extremity of the flange 33 is provided with a turned finger-engaging terminal 35 herein in the form of an outturned resilient bead. The outer diameter of the bead is larger than the inside diameter about the shoulders 24 of the fingers 20 so that in applying the cover member 19 it is adapted to be pressed axially inwardly into position on the wheel by camming the bead 35 over the cam surface 23 to snap behind the retaining shoulders 24.

In order to effect locking of the inner cover member by engagement thereof with the inner retaining terminal of the outer annular flange 19, the flange 25 of the inner cover member is spaced axially inwardly from the retaining shoulder 24 of the retaining finger extensions slightly less than the transverse or curl diameter of the retaining bead 35 of the outer cover member so that after the bead has been snapped behind the retaining shoulder 24, it will thrust in bottomed confronting relation against the flange 25 of the inner cover member and place the same under resilient axially inward tension. At the same time, of course, the tensioned condition in which the flange 25 is placed by such inter-engagement reacts axially outwardly against the bead 35 to hold it snugly against the retaining shoulder 24 and at the axially outer portion of the retaining extension inner axial faces 21.

In order to hold the annular outer cover member 19 against turning of the wheel in service due to torque stresses, and thereby possibly distort the valve stem 17, means are provided on the retaining bead 35 to cooperate with at least one of the retaining finger extensions 20 to hold the cover against turning. To this end, the retaining terminal has struck therefrom a pair of circumferentially spaced turn-preventing tabs 37 (Figs. 2 and 3) the spacing between which is sufficient to clear one of the retaining fingers therebetween. The turn-preventing tabs 37 are preferably properly related to the valve stem aperture 34 to fit at opposite sides of one of the retaining fingers 20 as an incident to registering the valve aperture 34 with the valve stem. As will be observed, the tabs 37 are struck directly from the material comprising the bead 35 but the striking out is held short of the edge extremity of the bead so that the bead remains continuous and of uniform resiliency throughout its entire diameter.

In assembling the cover 7 with the outer side of the wheel, the inner cover member 18 is first applied to the wheel and then the radially outer cover member 19 is applied by pressing it axially inwardly into snap-on relation with the retaining finger extensions 20. For removing the cover from the wheel, a pry-off tool may be applied behind the outer margin of the outer cover member 19 and fulcrumed against the terminal flange 14 to force the retaining bead 35 from engagement with one or more of the retaining fingers 20. Thereafter the inner cover member can be removed.

It will be observed that by virtue of the fact that the inner cover member outer bead 28 is disposed at the radially outer sides of the tip or terminal portions 22 of the retaining fingers 20, that when the outer cover member 19 is removed from the wheel, the inner cover member will be held by its outer marginal extremity at the radially outer side of the fingers 20 against falling away from the wheel, assuming that the wheel is in upright position at the time the outer cover member 19 is pried-off.

In the modification of Figure 4, the wheel is of substantially the same construction as in Figure 2, with the exception that the wheel body 8 has a generally radially outwardly and axially inwardly sloping outer marginal portion 38 instead of the groove or channel portion 9. The outer marginal attachment flange 10 of the wheel body 8 in Figure 4, however, has substantially the same axially outwardly projecting finger extensions as in Figure 2, such finger extensions being of outwardly tapering form and merging with the edge of the flange 10 on substantially wide tapering bases similarly as in Figs. 2 and 3. In the form of the invention in Fig. 4, however, a wheel cover assembly 39 is shown having an inner crown cover member 40 with a generally axially inwardly and radially outwardly extending marginal flange portion 41 which is adapted in assembly to bear or bottom against the annular cover portion 38 and has a generally axially outwardly extending terminal flange portion 42 provided with a turned reenforcing and retaining bead 43 adapted to bear in assembly with the wheel against the axially extending face 21 of the retaining fingers. The outside diameter of the bead 43 is such that it can be snapped behind the retaining finger extension shoulders 24. However, the axial extent of the flange 42 inclusive of the bead 43 is substantially less than the distance between the retaining finger shoulder 24 and the inner wheel body portion 38 so as to accommodate in assembly a retaining bead 44 on the inner extremity of a circular trim ring annulus 45 adapted to overlie the tire rim. The inner marginal bead 44 is at the inner terminus of a generally axially extending flange 47 of the outer cover member 45 of smaller diameter than the diameter described about the retaining finger shoulders 24 so as to clear the same, while the bead 44 engages in resilient tensioned retaining engagement behind the retaining shoulders 24 and shoulders thrustingly against the confronting bead 43 of the inner cover member to thereby thrust the margin of the inner cover member toward and into firm engagement with the wheel body while the counteracting thrust of the outer margin of the inner cover body through the bead 43 against the bead 44 holds it tightly against the retaining finger shoulders 24.

From the inner axial flange 47, the outer cover member 45 extends generally radially and axially outwardly to an outer terminal flange portion 48 having an underturned reenforcing and finishing bead-like extremity 49.

For accommodating the valve stem 17, the cover member 45 has a valve stem aperture 50. Moreover, in order to hold the cover member 45 against turning and thereby possible distortion of the valve stem 17, the body of the cover member 45 is provided with means for cooperation with the retaining fingers 20. To this end, a series of generally radially extending and axially inwardly indented ribs 51 are provided on the cover member 45, such ribs being spaced apart sufficiently to receive therebetween the retaining finger terminal portions 22 towards the sides of which the axially inner ends of the ribs are in confronting relation and thereby retain the circular cover member 45 against turning due to torque stresses in service.

For applying the cover assembly 39 to the wheel, the inner cover member 40 is first snapped axially inwardly into position past the retaining finger shoulders 24, and thereafter the outer cover member 45 is snapped home by axial pressure thereagainst to cam the same over the cam heads 23 of the retaining finger terminals 22 and behind the retaining shoulders 24 into confronting bottomed engagement with the retaining bead 43 of the inner cover member. Removal of the cover assembly is effected by first prying the radially outer annular cover member 39 from the wheel, and then prying the inner cover member free from the wheel by application of pry-off force behind the bead 43, with fulcruming of the pry-off tool, such as a screwdriver (not shown) against the tire rim on the shoulder between the base flange 11 and the side flange 12 which is adjacent to the retaining fingers 20.

Having reference now to the modification of Figure 5, a wheel body 52 of the disk spider type is provided having an inset annular marginal groove portion 53 from which extends axially outwardly an attachment flange 54 which is secured in suitable fashion to a base flange 55 of a tire rim. Struck up from the bottom of the groove portion 53 is a series of retaining finger extensions 57 each of which has a camming and retaining terminal 58 with a radially inwardly extending retaining shoulder hump 59 adjacent thereto.

For disposition at the outer side of the wheel in Figure 5 is a cover assembly including an inner crown cover member 60 and an outer annular cover member 61, the cover members having confronting marginal portions thereof lock-seamed together to provide a resilient cover retaining bead 62 dimensioned to engage in snap-on, pryoff relation with the retaining shoulders 59 of the retaining fingers 57, within the groove defined by the marginal portion 53 of the wheel body.

In all forms of the invention disclosed herein, the cover affords the appearance of a deep draw arrangement having a high crown and a high annular outer portion with a deeply indented intermediate portion. The components of the cover may be made from suitable sheet material such as stainleess steel, sheet or strip brass or the like. Externally the cover may be appropriately finished as by polishing and plating.

It will be understood that modifications and variations may be effected without departing from the scope of the novel concepts of the present invention.

I claim as my invention:

1. In a wheel structure including a multi-flange tire rim having a base flange, a wheel body formed from a sheet metal stamping having at its outer periphery a plurality of generally axially outwardly extending cover retaining extensions, the outer periphery of the wheel body being secured to the base flange of the tire rim with said cover retaining extensions projecting axially outwardly beyond the outer margin of the base flange and provided with generally axially inwardly facing respective shoulders, a cover for disposition at the outer side of the wheel including a pair of separable cover members one of which is engageable in bottoming relation against the wheel adjacent to said retaining extensions, and the other of which has a portion thereof for snap-on pry-off reaining engagement with said shoulders on the extensions and thrusts retainingly against said one cover member while said one cover member thrusts against said other cover member and thereby maintains it in engagement with said shoulders.

2. In a wheel structure including a multi-flange tire rim having a base flange, a wheel body formed from a sheet metal stamping having at its outer periphery a plurality of generally axially outwardly extending cover retaining extensions, the outer periphery of the wheel body being secured to the base flange of the tire rim with said cover retaining extensions projecting axially outwardly beyond the outer margin of the base flange and provided with generally axially inwardly facing respective shoulders, a cover for disposition at the outer side of the wheel including a pair of separable cover members one of which is engageable in bottoming relation against the wheel adjacent to said retaining extensions, and the other of which has a portion thereof for snap-on pry-off retaining engagement with said shoulders on the extensions and thrusts retainingly against said one cover member while said one cover member thrusts against said other cover member and thereby maintains it in engagement with said shoulders, said one cover member bottoming against the tire rim radially outwardly from said extensions.

3. In a wheel structure including a multi-flange tire rim having a base flange, a wheel body formed from a sheet metal stamping having at its outer periphery a plurality of generally axially outwardly extending cover retaining extensions, the outer periphery of the wheel body being secured to the base flange of the tire rim with said cover retaining extensions projecting axially outwardly beyond the outer margin of the base flange and provided with generally axially inwardly facing respective shoulders, a cover for disposition at the outer side of the wheel including a pair of separable cover members one of which is engageable in bottoming relation against the wheel adjacent to said retaining extensions, and the other of which has a portion thereof for snap-on pry-off retaining engagement with said shoulders on the extensions and thrusts retainingly against said one cover member while said one cover member thrusts against said other cover member and thereby maintains it in engagement with said shoulders, said one cover member bottoming against the wheel body radially inwardly from said retaining extensions.

4. In a wheel structure including a tire rim and a disk spider supporting wheel body having generally axially outwardly extending retaining finger extensions with rigid retaining shoulders thereon, a cover assembly for disposition at the outer side of the wheel including an inner cover member having a generally radially outwardly extending margin with apertures therein for clearance therethrough of the retaining finger extensions and an outer extremity for bottoming against the tire rim, the other of the cover members having a beaded edge engageable in snap-on-pry-off relation with the shoulders of the retaining finger extensions and thrusting under resilient tensioning engagement with said outer marginal portion of the one cover member.

5. In a wheel structure including a disk spider wheel body having a marginal portion provided with axially outwardly extending retaining finger extensions in one piece therewith, a cover assembly including a crown central portion with a radial marginal portion bottoming against the wheel body and having a generally axially outwardly directed beaded margin for snapping behind the retaining bumps on the retaining finger extensions, and an outer annular cover member having an inner beaded margin for snapping behind the retaining finger shoulders and engaging resiliently under axially inward thrust against the bead of the inner cover member.

6. In a wheel structure including a wheel body and a tire rim supported thereby and having rigid retaining finger extensions thereon spaced from the tire rim, a cover for disposition at the outer side of the wheel including means thereon providing portions for retaining engagement with the retaining fingers, and projections from the cover extending beyond said portions engageable at opposite sides of the retaining fingers for holding the cover against turning on the wheel.

7. In a wheel structure including a wheel body having rigid retaining finger extensions thereon, a cover for disposition at the outer side of the wheel including means thereon for retaining engagement with the retaining fingers, and projections from the cover engageable at opposite sides of the retaining fingers for holding the cover against turning on the wheel, said projections comprising struckout portions from the finger engaging margin of the cover.

8. In a wheel structure including a wheel body having rigid retaining finger extensions thereon, a cover for disposition at the outer side of the wheel including means thereon for retaining engagement with the retaining fingers, and projections from the cover engageable at opposite sides of the retaining fingers for holding the cover against turning on the wheel, said projections comprising indented ribs in the cover marginally engageable at opposite sides of the retaining fingers.

9. In a wheel structure including a multi-flange tire rim having a base flange and a side flange, a wheel body disk including an outer peripheral generally axially extending attachment flange structure secured to the base flange of the tire rim and having a plurality of axially outward cover retaining extensions, and a wheel cover including a generally axially inwardly extending annular retaining portion retainingly engaging said extensions and held by said extensions over the juncture of the tire rim and wheel body, said wheel cover having marginal projections thereon for confronting the sides of at least one of said retaining extensions to hold the cover against turning on the wheel.

10. In a wheel structure including a disk spider wheel body having a marginal portion provided with axially outwardly extending retaining finger extensions in one piece therewith, a cover assembly including a crown central portion with a radial marginal portion bottoming against the wheel body and having a generally axially outwardly directed beaded edge for snapping behind the retaining bumps on the retaining finger extensions, and an outer annular cover member having an inner beaded edge also constructed and arranged for snapping behind the retaining finger shoulders and interengaging resiliently with the bead of the inner cover member.

References Cited in the file of this patent

UNITED STATES PATENTS

| 2,386,230 | Lyon | Oct. 9, 1945 |
| 2,386,242 | Lyon | Oct. 9, 1945 |
| 2,445,330 | Lyon | July 20, 1948 |
| 2,497,895 | Lyon | Feb. 21, 1950 |
| 2,592,584 | Lyon | Apr. 15, 1952 |
| 2,669,487 | Horn | Feb. 16, 1954 |

FOREIGN PATENTS

| 718,346 | Great Britain | Nov. 10, 1954 |